US009026275B1

(12) United States Patent
Young et al.

(10) Patent No.: US 9,026,275 B1
(45) Date of Patent: May 5, 2015

(54) IN-FLIGHT GENERATION OF RTA-COMPLIANT OPTIMAL PROFILE DESCENT PATHS

(71) Applicants: Shih-Yih Young, Marion, IA (US); Kristen M. Jerome, Monticello, IA (US)

(72) Inventors: Shih-Yih Young, Marion, IA (US); Kristen M. Jerome, Monticello, IA (US)

(*) Notice: Subject to any disclaimer, the term of this patent is extended or adjusted under 35 U.S.C. 154(b) by 0 days.

(21) Appl. No.: 13/949,612

(22) Filed: Jul. 24, 2013

(51) Int. Cl.
*G01C 21/20* (2006.01)
*B64C 19/00* (2006.01)

(52) U.S. Cl.
CPC .................................... *B64C 19/00* (2013.01)

(58) Field of Classification Search
None
See application file for complete search history.

(56) References Cited

U.S. PATENT DOCUMENTS 4,825,374 A * 4/1989 King et al. ........................ 701/5
5,445,021 A * 8/1995 Cattoen et al. .............. 73/178 R
6,507,782 B1 * 1/2003 Rumbo et al. ................ 701/121
7,650,232 B1 * 1/2010 Paielli ........................... 701/528
7,952,492 B2 * 5/2011 Constans ....................... 340/973
8,027,758 B2 * 9/2011 Ferro et al. ...................... 701/18
8,150,565 B2 * 4/2012 Wachenheim et al. ........... 701/5
8,165,734 B2 * 4/2012 Wachenheim et al. ........... 701/7
8,170,727 B2 * 5/2012 Deker ................................ 701/3
8,234,068 B1 * 7/2012 Young et al. .................. 701/528
8,311,687 B2 * 11/2012 Bakker ............................. 701/3
8,321,071 B2 * 11/2012 Klooster ........................... 701/3
8,332,083 B1 * 12/2012 McCusker ......................... 701/4
8,332,145 B2 * 12/2012 Dacre-Wright et al. ...... 701/465
8,352,169 B2 * 1/2013 Coulmeau et al. ............ 701/121
8,386,097 B2 * 2/2013 de Menorval et al. .......... 701/10
8,433,506 B2 * 4/2013 Saggio et al. ................. 701/120
8,473,120 B2 * 6/2013 Blanchon et al. ................. 701/3
8,565,938 B2 * 10/2013 Coulmeau et al. ................ 701/3
8,655,506 B2 * 2/2014 Gomez et al. ..................... 701/3
8,676,403 B2 * 3/2014 Garrido-Lopez et al. ......... 701/3
8,718,912 B2 * 5/2014 Wachenheim et al. ....... 701/120
8,818,576 B2 * 8/2014 Maldonado et al. .............. 701/4
8,849,478 B2 * 9/2014 Coulmeau et al. .............. 701/14
2005/0283281 A1 * 12/2005 Hartmann et al. ................ 701/4
2006/0265110 A1 * 11/2006 Ferro et al. ......................... 701/3
2006/0273928 A1 * 12/2006 Van Boven ................... 340/945
2008/0215196 A1 * 9/2008 Deker ............................... 701/5
2008/0262665 A1 * 10/2008 Coulmeau et al. .............. 701/16
2010/0217461 A1 * 8/2010 Ledesma et al. ................ 701/18
2010/0241345 A1 * 9/2010 Cornell et al. ................ 701/120
2011/0137495 A1 * 6/2011 Sacle et al. ........................ 701/3
2011/0251740 A1 * 10/2011 Gomez Ledesma et al. ..... 701/8
2011/0295501 A1 * 12/2011 Gutierez-Castaneda et al. ............................ 701/206
2012/0059535 A1 * 3/2012 Jackson et al. .................... 701/3
2012/0209459 A1 * 8/2012 Klooster .......................... 701/18
2012/0209515 A1 * 8/2012 Klooster ....................... 701/439
2013/0317739 A1 * 11/2013 Coulmeau et al. ............ 701/465
2014/0018980 A1 * 1/2014 Bollapragada et al. ......... 701/10
2014/0067245 A1 * 3/2014 Polansky et al. .............. 701/121
2014/0088799 A1 * 3/2014 Tino et al. .......................... 701/3
2014/0188312 A1 * 7/2014 Boorman et al. ................. 701/3
2014/0188378 A1 * 7/2014 Sawhill et al. ................ 701/122
2014/0257598 A1 * 9/2014 Bailey et al. ...................... 701/3
2014/0350755 A1 * 11/2014 Caillaud et al. ................. 701/18

* cited by examiner

*Primary Examiner* — Jonathan M Dager
(74) *Attorney, Agent, or Firm* — Angel N. Gerdzhikov; Donna P. Suchy; Daniel M. Barbieri

(57) ABSTRACT

A on-aircraft computer device predicts aircraft states (e.g., altitude, speed, flight path angle, and fuel consumption) at any given time, while utilizing a Deterministic Genetic Algorithm to search 4-D flight path candidates that can comply with all path constraints to produce a feasible 4-D path candidate as a final OPD flight path to arrive at a metering waypoint in a specified time window.

14 Claims, 7 Drawing Sheets

IN-FLIGHT GENERATION OF RTA-COMPLIANT OPTIMAL PROFILE DESCENT PATHS

FIELD OF THE INVENTION

The present invention is directed generally toward avionics system and more particularly toward flight path computing.

BACKGROUND OF THE INVENTION

During aircraft transition from en route to landing, air traffic controllers frequently issue instructions (or clearances) to change aircraft trajectories. These instructions can include temporary altitude assignments for level segments, speed adjustments, or lateral vectoring, enabling traffic controllers to manage air traffic flow while ensuring proper aircraft separation and flight safety. However, these controller instructions may also require aircraft to execute suboptimal tactical maneuvers, such as stair-step descents. A stair-step descent burns significantly more fuel and generates more carbon emission and engine noise than an uninterrupted Optimal Profile Descent (OPD) because OPDs use idle or near-idle thrust to execute a smooth speed-and-altitude profile during the descent phase of flight, while complying with multiple path constraints.

The drawback to OPDs is that, if only idle thrust is used during descent, the descent profile (i.e., the vertical path that aircraft flies) is a function of not only aircraft speed, aircraft weight, wind and temperature, but also aircraft platforms and engine types. Therefore, the idle descent profile can vary from one aircraft to another and from one flight to another flight at a different date. In other words, the vertical profile of OPD with idle thrust may not be repeated exactly by another aircraft or for another flight by the same aircraft. Therefore, how to incorporate OPDs with idle thrust into traffic flow without reducing air traffic capacity around an airport is a key operational consideration. One way to eliminate this concern of path unpredictability, while retaining most of OPD benefits, is to only use path segments with constant flight path angles during descent. Thus, the vertical descent profile is clearly defined. The difference in fuel savings between descent profiles with idle thrust and descent profiles with constant flight path angles are relatively small. But, the descent profile with constant flight path angles is predictable, even though it requires the use of near-idle thrust and speed brake.

Various OPD flight trials with different air-ground collaboration architectures have been conducted to evaluate the operational benefits and issues of OPDs. Depending on the air traffic density around the airport, the degree of interaction between air traffic controllers and pilots can vary greatly. For airports with light traffic environments, little interaction is needed to enable OPDs and OPDs can be performed most of the time, if aircraft is properly equipped. OPDs can currently be performed at a few select busy airports during off-peak hours.

To enable OPDs without reducing traffic capacity throughout the Terminal Radar Approach Control (TRACON) area, a Required Time of Arrival (RTA) constraint is usually imposed by air traffic controllers at a metering waypoint on the boundary of the TRACON area or on an Initial Approach Fix (IAF) to enable safe air traffic merging.

Consequently, it would be advantageous if an apparatus existed that is suitable for in-flight constructing a four dimensional trajectory for implementing an OPD to arrive at a metering waypoint at a RTA.

SUMMARY OF THE INVENTION

Accordingly, the present invention is directed to a novel method and apparatus for in-flight constructing a four dimensional trajectory for implementing an OPD to arrive at a metering waypoint at a RTA.

In at least one embodiment of the present invention, a on-aircraft computer device predicts aircraft states (e.g., altitude, speed, flight path angle, and fuel consumption) at any given time, while utilizing a Deterministic Genetic Algorithm to search 4-D flight path candidates that can comply with all path constraints to produce a feasible 4-D path candidate as a final OPD flight path.

In another embodiment of the present invention, a method for establishing an OPD flight path comprises receiving one or more constraints from an air traffic controller and adjusting aircraft states (e.g., altitude, speed, flight path angle, and fuel consumption) using a Deterministic Genetic Algorithm to produce a feasible 4-D path candidate as a final OPD path.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments will not be described in detail to avoid unnecessarily obscuring the description.

Figure 1:
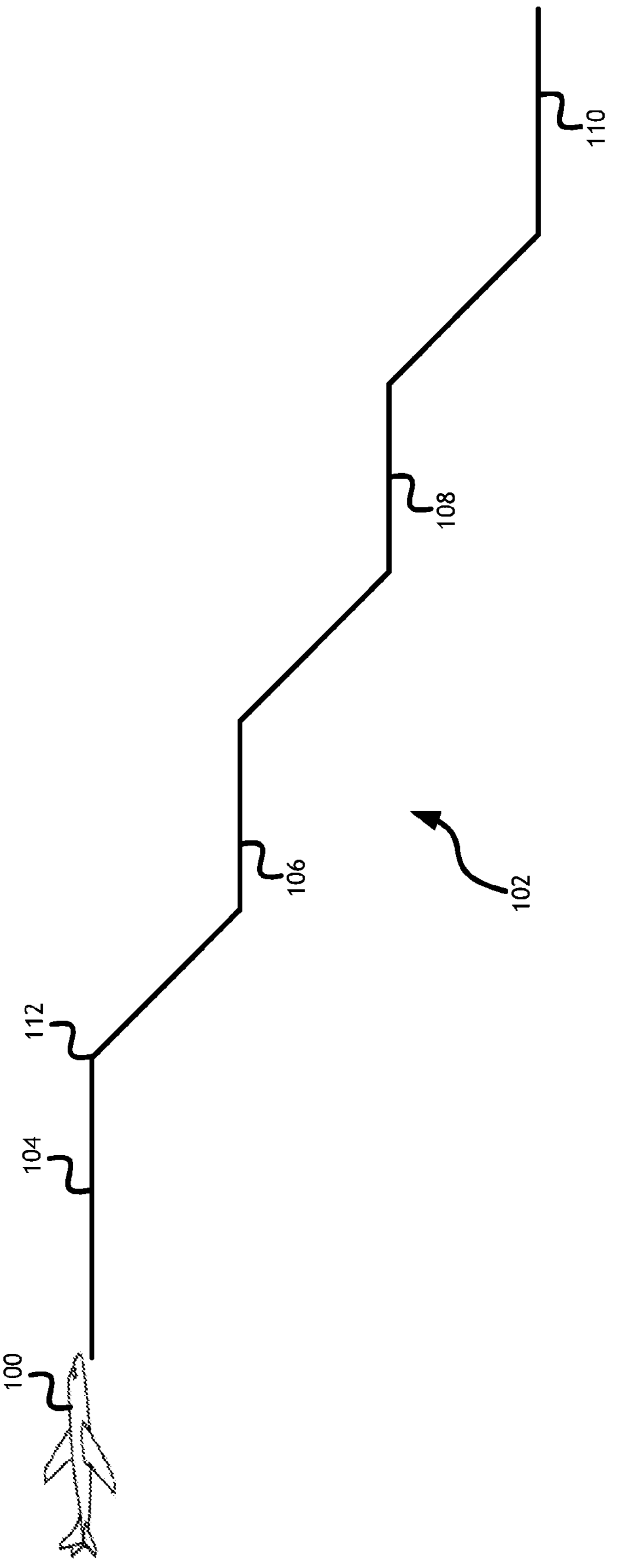
FIG. 1 shows a side view representation of a stair-step descent path.

Referring to FIG. 1, a side view representation of a stair-step descent path is shown. An aircraft 100 at a cruise altitude 104 needs to descend to a final waypoint altitude 110. The aircraft 100 may be required to descend along a stair-step descent path 102 beginning at the top of descent (TOD) 112, descending to a first level altitude 106 before leveling off and continuing at that altitude. After cruising at the first level altitude 106, the aircraft 100 may descend to a second level altitude 108 before leveling off again and continuing at that altitude. After cruising at the second level altitude 108, the aircraft 100 may descend to the final waypoint altitude 110 before leveling off again. During each descent, the aircraft 100 may descend with idle thrust. Leveling off to maintain each level altitude 106, 108 consumes substantially more fuel than relative to a continual idle descent due to excessive fuel consumption to overcome inertia while leveling off.

Figure 2:
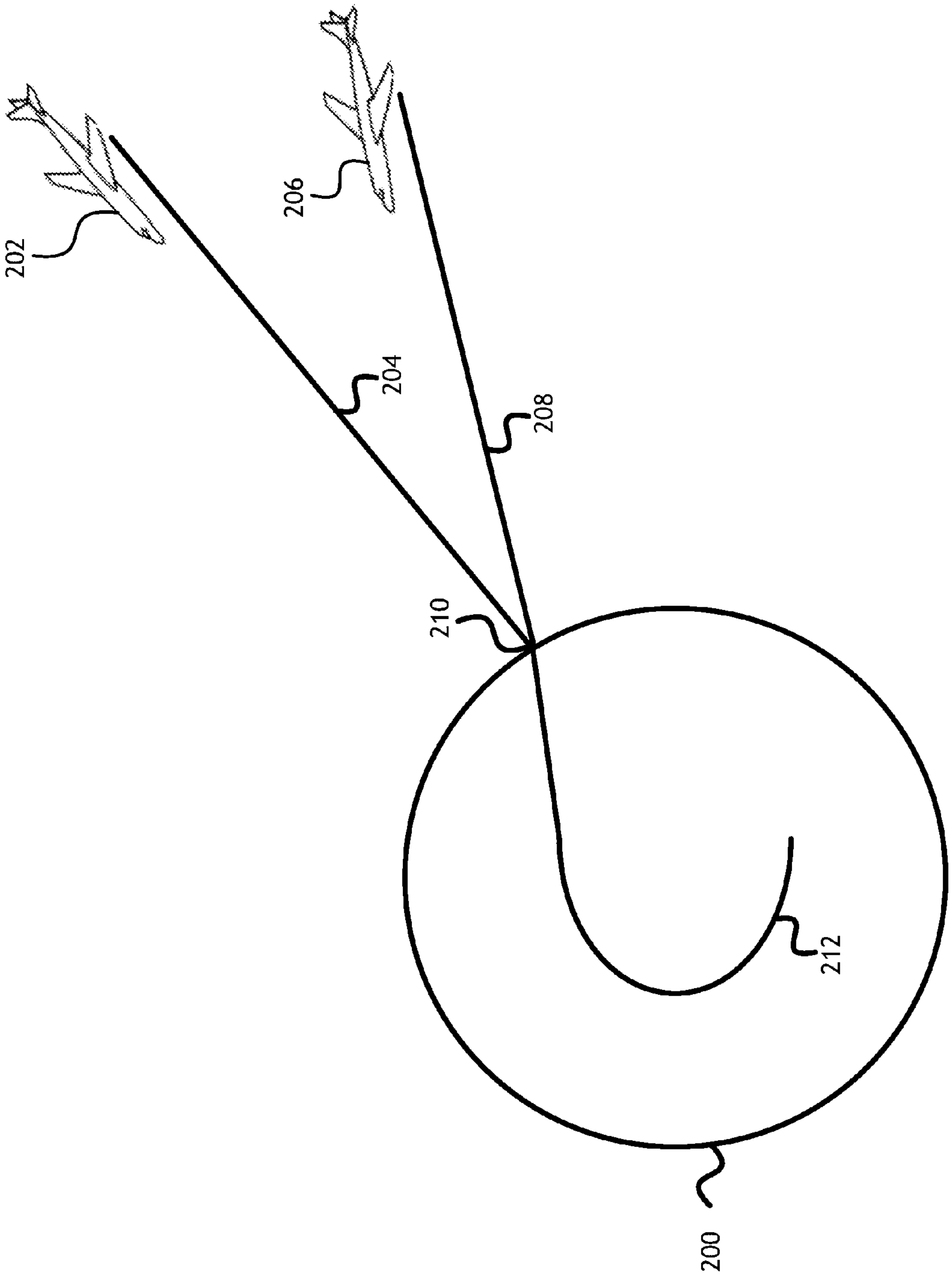
FIG. 2 shows an overhead view of flight paths toward a final approach.

Referring to FIG. 2, an overhead view of flight paths toward a final approach is shown. A boundary area 200 defined by a TRACON around an airport. Aircraft 202, 206 must pass through the boundary area 200 when on a final approach 212. Air traffic controllers generally direct aircraft 202, 206 through a metering waypoint 210 at or near the boundary area 200 to more easily control the approach and spacing of aircraft 202, 206 on approach to the airport. Air traffic controllers control access to the metering waypoint 210 by allocating narrow time windows to each aircraft 202, 206 such that a first aircraft 202 on a first flight path 204 must pass through the metering waypoint 210 during a first time window and a second aircraft 208 on a second flight path must pass through the metering waypoint 210 during a second time window.

Flight path 204, 208 constraints imposed on a flight path 204, 208 are designed to ensure proper aircraft separation and enable air traffic controllers to manage traffic flow safely. Flight path 204, 208 constraints issued by air traffic controllers for OPD operations according to the present invention can be 1) altitude constraints, such as at or above, at or below, or at a specific altitude; 2) speed constraints at a waypoint or a particular altitude; or 3) Required Time of Arrival constraints at a metering waypoint.

Figure 3:
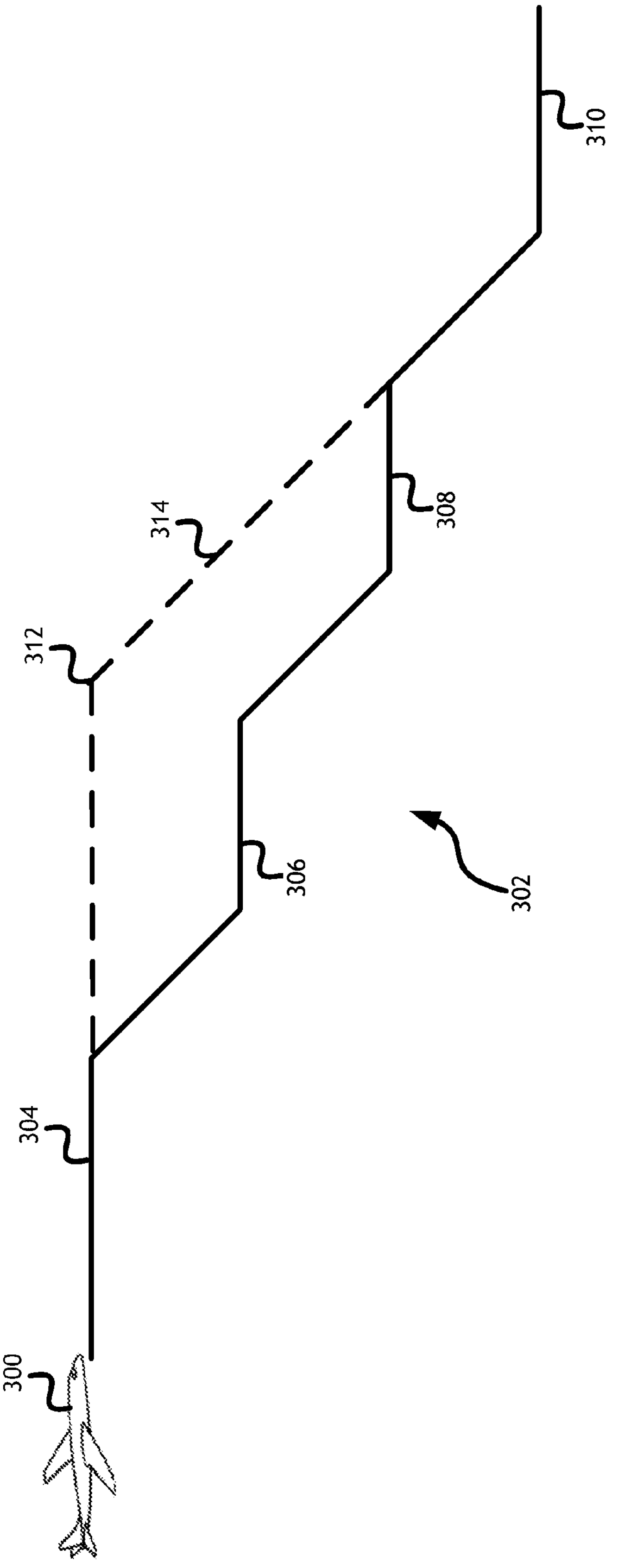
FIG. 3 shows a side view representation of an uninterrupted descent profile according to the present invention as compared to a stair-step descent path.

Referring to FIG. 3, a side view representation of an uninterrupted descent profile according to the present invention as compared to a stair-step descent path is shown. An aircraft 300 at a cruise altitude 304 needs to descend to a final waypoint altitude 310. In a stair-step descent, the aircraft 300 may descend along path 302, descending to a first level altitude 306 before leveling off and continuing at that altitude, cruising at the first level altitude 306 for a period of time, descending to a second level altitude 308 before leveling off again and continuing at that altitude for a period of time, and descending to the final waypoint altitude 310 before leveling off again.

Alternatively, an aircraft 300 traveling along a flight path according to the present invention may maintain the cruise altitude 304 at a particular speed until reaching a TOD waypoint 312, when the aircraft 300 enters a substantially uninterrupted idle descent segment 314 until reaching the final waypoint altitude 310. The speed at cruise altitude 304 and location of the TOD waypoint 312 may be determined according to embodiments of the present invention to conform with certain given constraints such as a RTA at a metering waypoint, and taking into account relevant factors such as wind speed and direction, and aircraft 300 properties such as weight.

Embodiments of the present invention determine a 4-D path, in terms of position and time, that minimizes fuel consumption while complying with path constraints. In addition, both initial and final conditions of the trajectory are given. In other words, the initial aircraft location and speed are specified as well as the location, speed and RTA of the final metering waypoint. Therefore, determining an RTA-compliant OPD path (in this example, the idle descent segment 314) is a nonlinear, two-point boundary-value problem, which is in general extremely difficult to solve analytically. Thus, this type of problems is generally solved numerically to obtain near-optimal solutions.

Figure 4:
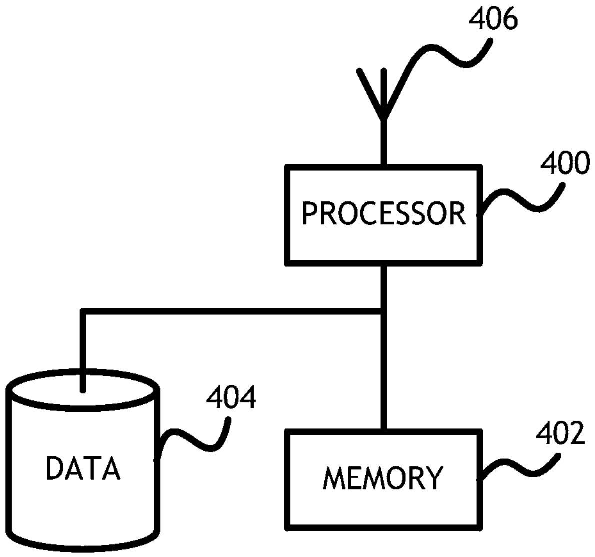
FIG. 4 shows a computer apparatus useful for implementing embodiments of the present invention.

Referring to FIG. 4, a computer apparatus useful for implementing embodiments of the present invention is shown. The computer apparatus may include a processor 400, memory 402 connected to the processor 400 and an antenna 406 connected to the processor 400. The processor 400 may be configured to receive flight path constraints through the antenna 406 and determine an OPD flight path. In at least one embodiment the apparatus may also include a data storage element 404 connected to the processor 400. The data storage element 404 may contain certain aircraft characteristic information. The present invention may be implemented in software to reduced fuel cost and carbon emission.

Figure 5:
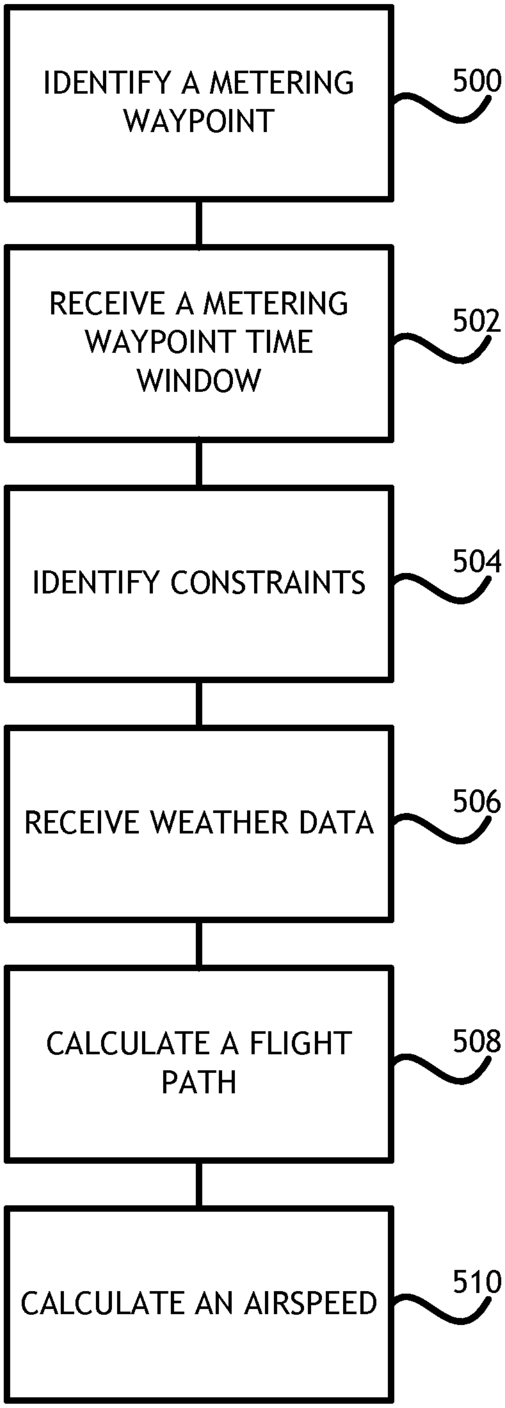
FIG. 5 shows a flowchart of a method for producing an uninterrupted descent profile conforming to air traffic controller imposed constraints.

Referring to FIG. 5, a flowchart of a method for producing an uninterrupted descent profile conforming to air traffic controller imposed constraints is shown. In at least one embodiment of the present invention, a method for generating RTA-compliant OPD paths in-flight includes receiving or identifying 500 a metering waypoint. The on-board computer may also receive 502 a metering waypoint time window (RTA) and identify 504 one or more additional constraints.

When generating the 4-D flight paths for OPDs in-flight, an on-aircraft computer device may also receive 506 and take into account the up-to-date wind and temperature profile data. Since the RTA is imposed at a metering waypoint, the on-aircraft computer device may need to convert the airspeed maintained by an auto-throttle system to ground speed so that the traversal time to the metering waypoint can be estimated. Based on the difference between the estimated traversal time and RTA, the on-aircraft computer device can adjust the reference airspeed for the auto-throttle system. The airspeed to ground speed conversion requires accurate wind data. Therefore, it is critical for the on-aircraft computer device to use the up-to-date wind profile data when constructing the 4-D trajectory of an OPD operation.

The on-aircraft computer calculates 508 a flight path including a substantially continuous idle descent that complies with the RTA at the metering waypoint, weather data and other constraints. The equations of motion used to determine a vertical flight profile are summarized below:

$$\frac{dh}{dt} = \frac{(T-D)V_T/W}{\left(1 + \frac{V_T}{g}\frac{dV_T}{dh}\right)}$$

Where h is the altitude, T is the thrust, D is the drag, W is the aircraft gross weight, t is the time, g is the gravity, and $V_T$ is the true air speed. The rate of descent relative to wind can also be expressed as:

$$\frac{dh}{dt} = V_T \sin\gamma$$

assuming a constant flight path angle γ during one small numerical integration interval. Because the flight path angle is relatively small during descent, the equations can be combined as into:

$$\gamma \cong \frac{1}{V_T}\frac{dh}{dt} = \frac{(T-D)}{W\left(1 + \frac{V_T}{g}\frac{dV_T}{dh}\right)}$$

The present invention may use a layered approach with the first layer generating an idle descent path as the reference path and the second layer using a Deterministic Genetic Algorithm based method to refine the reference path. To compute the idle descent path an iterated approach using a pair of backward and forward sweeps may be used to determine a speed-and-altitude profile. The starting point for the backward sweep may be first set at the metering waypoint on the descent path with an estimated end gross weight at this location. The flight path may be built backward by numerically integrating the equation $$\frac{dh}{dt}=\frac{(T-D)V_T/W}{\left(1+\frac{V_T}{g}\frac{dV_T}{dh}\right)}$$

from the starting point up to cruise altitude to determine an estimated top-of-descent. The flight path is then calculated forward by using the estimated top-of-descent as the starting point and is built forward to the metering waypoint with an updated end gross weight. This iterated process is repeated until the forward path calculation matches the backward path calculation within some thresholds for both vertical and along track position differences. To minimize the fuel consumption, the throttle setting is set at idle during descent; thus, the vertical path from top-of-descent to the metering waypoint is called the idle descent path.

A constant deceleration segment may precede each speed constrained waypoint to ensure the air speed can be reduced to meet the speed constraint at that waypoint. For example, there can be a constant deceleration segment preceding the altitude for airport speed restriction (e.g., 250 knots at 10,000 ft). However, due to the use of idle thrust, the generation of the idle descent path cannot consider the RTA constraint. An RTA constraint is a time window at a metering waypoint when the aircraft is expected to arrive to facilitate multiple aircraft entering a controlled airspace through the same waypoint.

When an RTA constraint is imposed at a metering waypoint, idle thrust alone may not be adequate to speed up the aircraft to meet the RTA constraint. Therefore, there is a need to refine the idle descent path generated at the first stage to comply with the RTA constraint and other path constraints.

If the time difference between Estimated Time of Arrival (ETA) of the idle descent path and RTA at the metering waypoint is within a user specified threshold (e.g., 6 seconds), the idle descent path is deemed to be compliant with this RTA constraint. If there are no other constraint violations (e.g., minimum or maximum flight path angles), this idle descent path is identified as the final RTA-compliant OPD path. However, if the time difference is equal to or greater than the threshold, further refinement of this idle descent path is required.

A Genetic Algorithm is used to refine the infeasible idle descent path and ensure the final speed-and-altitude profile is feasible. Whereas existing Genetic Algorithms may use a randomized approach, the present invention removes the randomness aspect of Genetic Algorithms by using identical initial seed values with a random number generator when constructing the OPD flight path. Therefore, with the same input data, identical results can be generated by the Genetic Algorithm. In other words, a Deterministic Genetic Algorithms is adopted for the refinement layer.

Depending on whether path candidate G is feasible (i.e., no constraint violations) or infeasible (i.e., at least one constraint is violated), the fitness value F of a path candidate G is defined as $$F(G)=\begin{cases}\dfrac{1}{\text{Path\_Cost}(G)}, & G \text{ is feasible}\\[2ex] \dfrac{1}{C_{max}+NPC(G)}, & G \text{ is infeasible}\end{cases}$$

Where Path_Cost(G) is the accumulated fuel consumption for path candidate G; $C_{max}$ is the maximum path cost for the worst feasible path; and NPC(G) is the normalized penalty cost for violating constraints.

The present invention may take into account RTA, flight path angle, speed, maximum and minimum true airspeed, or other constraints imposed by an air traffic controller or physical properties of the aircraft. The present invention may also treat a nominal descent path profile as an additional path constraint such that the RTA-compliant OPD trajectory generated by the present invention is similar to a nominal vertical path profile that can only have two types of speed segments.

The ETA at a specific waypoint with a RTA constraint should be within a threshold (e.g., 6 seconds). The normalized penalty cost $NP_{RTA}$ for this constraint may be defined as:

$$NP_{RTA}(i)=\begin{cases}0, & |\Delta T_i|<TD\\ |\Delta T_i|, & |\Delta T_i|\geq TD\end{cases},\quad i=1,\ldots,n_{RTA}$$

Where $\Delta T_i=ETA_i-RTA_i$ for the ith waypoint with a RTA constraint and $n_{RTA}$ is the total number of waypoints with RTA constraints.

The flight path angle $\gamma$ of the descent path is limited by maximum (e.g., −2 degrees) and minimum (e.g., −6 degrees) values. The normalized penalty cost $NP_\gamma$ for this constraint may be defined as:

$$NP_\gamma=\begin{cases}|\gamma-\gamma_{min}|, & \gamma<\gamma_{min}\\ |\gamma-\gamma_{max}|, & \gamma>\gamma_{max}\\ 0, & \gamma_{min}\leq\gamma\leq\gamma_{max}\end{cases}$$

Where $\gamma_{max}$ and $\gamma_{min}$ are the maximum and minimum flight path angles, respectively.

The on-aircraft computer may also calculate 510 an airspeed. The speed at a specific altitude may be constrained to be at or below a specified value. The ground track of this waypoint may be free to change. In other words, the speed and altitude of a waypoint on the descent path may be constrained, but the ground track of this waypoint may be fixed or changeable. The normalized penalty cost $NP_S$ for this constraint may be defined as:

$$NP_s(i)=\begin{cases}\dfrac{(V-V_s(i))}{V_s(i)}, & V>V_s(i)\\ 0, & V\leq V_s(i)\end{cases},\quad i=1,\ldots,n_s$$

Where $V_S(i)$ is the constrained speed at the ith speed-constrained waypoint; V is the planned speed; and $n_S$ is the total number of waypoints with speed constraints.

The true airspeed should stay within the flight envelope of the aircraft. The normalized penalty cost $NP_v$ for this constraint may be defined as:

$$NP_v=\begin{cases}V_{ktas}/V_{ktas}^{max}, & V_{ktas}>V_{ktas}^{max}\\ V_{ktas}^{min}/V_{ktas}, & V_{ktas}<V_{ktas}^{min}\\ 0, & V_{ktas}^{min}\leq V_{ktas}\leq V_{ktas}^{max}\end{cases}$$

Where $V_{ktas}{}^{max}$ and $V_{ktas}{}^{min}$ are the maximum and minimum true air speeds in units of knots, respectively.

With the definition of normalized penalty cost for each constraint, the NPC(G) may be computed as:

$$NPC(G)=w_\gamma*NP_\gamma+w_v*NP_v+\sum_{i=1}^{n_s}(w_s*NP_s(i))+\sum_{i=1}^{n_{RTA}}(w_{RTA}*NP_{RTA}(i))$$

Where w is a weighting factor for a component of the normalized penalty cost. In at least one embodiment, all weighting factors have the same value such as a value of one.

Figure 6:
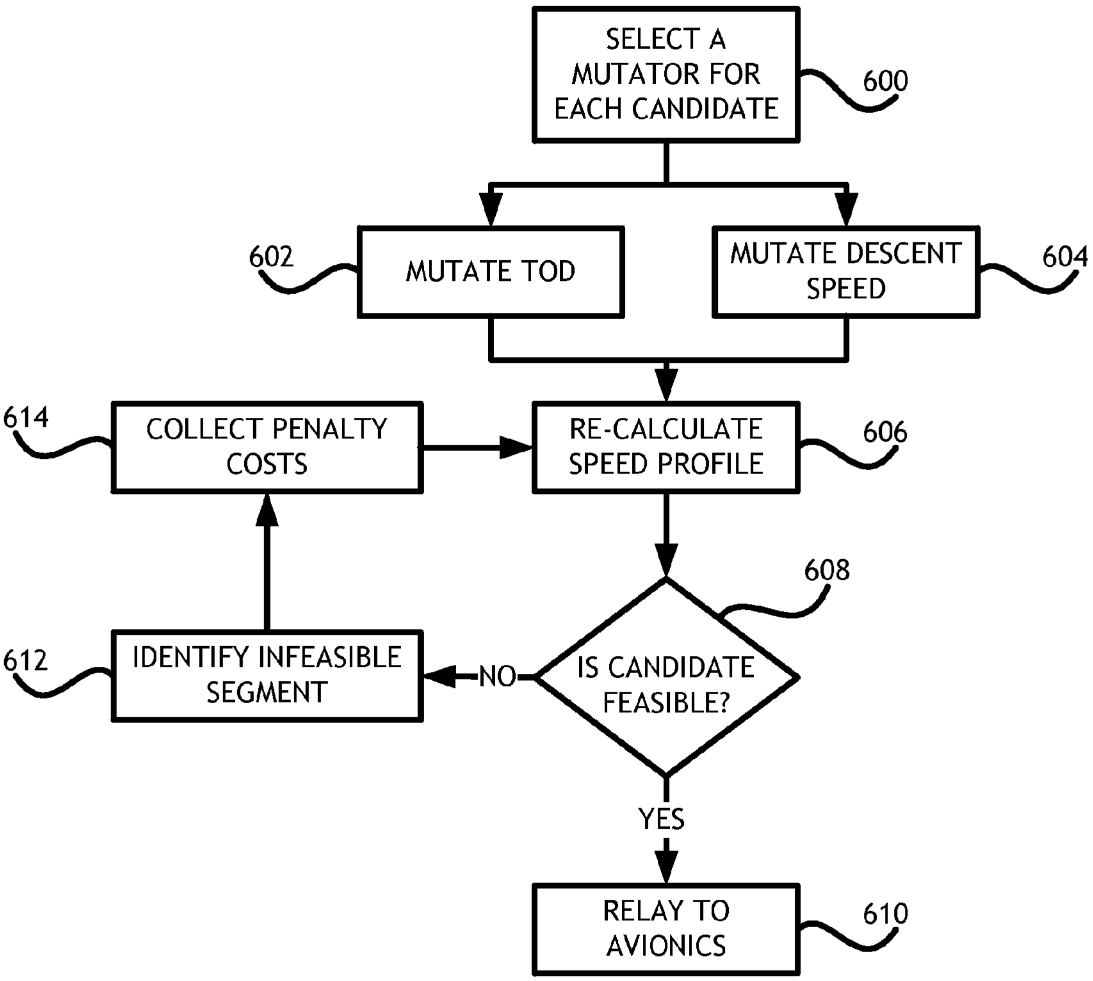
FIG. 6 shows a flowchart of a method for producing a flight path candidate conforming to one or more constraints is shown.

Referring to FIG. 6, a flowchart of a method for producing a flight path candidate conforming to one or more constraints is shown.

A Deterministic Genetic Algorithm may use one or more genetic operators or mutators to adjust the flight path candidates to be compliant with flight path constraints. The Deterministic Genetic Algorithm may randomly select a mutator in 600 with a uniform probability, if no specific probability distribution function is defined.

A TOD mutator moves 604 the TOD along the flight path. In at least one embodiment, movement may be based on the difference between ETA and RTA. The amount of the movement may be determined by:

$$\Delta T = \text{ETA} - \text{RTA}$$

$$\Delta S = \begin{cases} \alpha * \Delta T * V_{cruise}, \\ -\alpha * \Delta T * V_{cruise}, \end{cases} \alpha \in \left[\gamma, \frac{TD}{|\Delta T|}\right]$$

$$\text{TOD}_{ATrack}' = \text{TOD}_{ATrack} + \Delta S$$

Where $\Delta S=\alpha*\Delta T*V_{cruise}$ if the ground track of at least one constrained waypoint is fixed or $\Delta S=-\alpha*\Delta T*V_{cruise}$ if the ground track of every constrained waypoint is free to move (i.e., only altitude and/or speed at the waypoint are constrained). Also, $TOD_{ATrack}$ is the "along track" of the TOD (i.e., the horizontal distance from the current aircraft cruise location); $TOD'_{ATrack}$ is the updated "along track" of the TOD location; $V_{cruise}$ is the ground speed at cruise; $\gamma=\beta TD/|\Delta T|$ with $\beta=0.2$ when $|\Delta T|\leq$Dev_TD_L or $\beta=0.5$ when $|\Delta T|>$Dev_TD_L; Dev_TD_L is a threshold value and $\alpha$ is a randomly selected value from a specified range.

Based on whether the ground track of any waypoint on the descent path is fixed or not, a different equation is used to compute $\Delta S$. For example, when $\Delta T>0$ and the ground track is not fixed for any waypoint on the descent path, aircraft can always descend earlier to shorten the traversal time and meet the RTA. However, when $\Delta T>0$ and the ground track of at least one waypoint is fixed, aircraft should descend later and fly longer at cruise to shorten the traversal time.

A descent speed mutator adjusts the cruise Mach speed and/or descent CAS speed based on the difference between ETA and RTA determined by:

$$\Delta T = \text{ETA} - \text{RTA}$$

$$ind_{Mach} = \begin{cases} \alpha + 2, & |\Delta T| > \text{Dev\_TD\_L} \\ \alpha + 1, \text{Dev\_TD} < & |\Delta T| \leq \text{Dev\_TD\_L} \\ \alpha, & |\Delta T| \leq \text{Dev\_TD\_L} \end{cases}$$

$$ind_{CAS} = \begin{cases} \alpha_1 + 2, & |\Delta T| > \text{Dev\_TD\_L} \\ \alpha_1 + 1, \text{Dev\_TD} < & |\Delta T| \leq \text{Dev\_TD\_L} \\ \alpha_1, & |\Delta T| \leq \text{Dev\_TD\_L} \end{cases}$$

$$\text{selection} = \begin{cases} \text{Mach\_Only} = 1 \\ \text{CAS\_Only} = 2 \\ \text{Both} = 3 \end{cases}$$

$$Mach_{dev} = [0.01\ 0.02\ 0.03\ 0.04]$$

$$CAS_{dev} = [2\ 5\ 10\ 15] \text{ knots}$$

Where $\alpha$ and $\alpha_1$ may be randomly selected from the specified range with $\alpha \in Z : 1 \leq \alpha \leq 2$ and $\alpha_1 \in Z : 1 \leq \alpha_1 \leq 2$; Dev_TD and Dev_TD_L may be thresholds to determine a larger or smaller speed deviation is preferred to meet RTA and Dev_TD<Dev_TD_L; $ind_{Mach}$ and $ind_{CAS}$ may be indices used to extract the correct deviations from $Mach_{dev}$ and $CAS_{dev}$ arrays, respectively; selection may be randomly determined to indicate which type of speed deviation will be applied (Mach only, CAS only or both Mach and CAS). However, selection may always be set to both when $|\Delta T|>$Dev_TD_L; $Mach_{dev}$ is the array containing the possible speed deviations to adjust the cruise Mach speed and $CAS_{dev}$ is the array containing the possible deviations to adjust the current descent CAS speed.

Where ETA is late as compared to RTA ($\Delta T>0$), and Mach or Mach and CAS are selected (selection≠CAS), then $M'_{cruise}=M_{cruise}+Mach_{dev}(ind)$ where $M'_{cruise}$ is the updated cruise Mach speed and $Mach_{dev}(ind)$ is the selected Mach deviation. If $M'_{cruise}>M_{max}$, then $M'_{cruise}=M_{max}$(maximum cruise Mach). If CAS or Mach and CAS are selected (selection≠Mach), then $CAS'_{descent}=CAS_{descent}$ $CAS_{dev}(ind)$ where $CAS'_{descent}$ is the updated descent CAS speed and $CAS_{dev}(ind)$ is the selected CAS deviation. If $CAS'_{descent}>CAS_{max}$, then $CAS'_{cruise}=CAS_{max}$ (maximum descent CAS). On the other hand, where ETA is early as compared to RTA, and Mach or Mach and CAS are selected (selection≠CAS), then $M'_{cruise}-M_{cruise}-Mach_{dev}(ind)$. If $M'_{cruise}<M_{min}$, then $M'_{cruise}=M_{min}$ (minimum cruise Mach). If CAS or Mach and CAS are selected (selection≠Mach), then $CAS'_{descent}=CAS_{descent}-CAS_{dev}(ind)$. If $CAS'_{descent}<CAS_{min}$, then $CAS'_{cruise}=CAS_{min}$ (minimum descent CAS).

$M'_{cruise}$ and $CAS'_{descent}$ determined by this mutator may be compared with a speed command table that stores pairs of speed commands that have been tried before for a particular planning process. If a particular pair $M'_{cruise}$ and $CAS'_{descent}$ exists in the speed command table, such pair of the speed commands has been tried before and is not tried again. A new iteration to determine the updated speed commands will be performed by this mutator (up to a threshold number of iterations such as five iterations). However, if the particular pair $M'_{cruise}$ and $CAS'_{descent}$ does not exist in the speed command table, such pair may be saved to the speed command table and used to adjust the speed commands of the select flight path candidate.

After a genetic operator is applied to the flight path candidate, the speed profile of the flight path candidate may be re-computed 606 with $M'_{cruise}$ and $CAS'_{descent}$. In at least one embodiment, the equation $$\frac{dh}{dt} = \frac{(T - D)V_T / W}{\left(1 + \frac{V_T}{g}\frac{dV_T}{dh}\right)}$$

is integrated. For new flight path candidates, the default integration step size is fine as opposed to coarse. If |ETA–RTA| is smaller than a defined FINE_STEP_ENTRY value and the flight path candidate is currently set to the coarse integration step size (for example, 20 knots per 400 ft altitude change), then the on-aircraft computer device may switch to the fine integration step size (e.g., 5 knots per 100 ft altitude change). Otherwise, if |ETA–RTA| is greater than or equal to a defined COARSE_STEP_EXIT value and the flight path candidate is currently set to the fine integration step size, the on-aircraft computer device may switch to the coarse integration step size. Furthermore, if a TOD mutator is used 602, the equation may be integrated from the current aircraft location to the new TOD by using the thrust required to maintain the cruise speed and altitude and performs trajectory integration from the starting waypoint at the new TOD location. If a descent speed mutator is used 604, the on-aircraft computer device re-calculates 606 the idle descent path with the updated cruise Mach and descent CAS, then determines the starting waypoint for trajectory integration.

In at least one embodiment, integration includes determining 608 if the candidate path is feasible or not. If the candidate path is feasible and the coarse integration step size was used to re-compute the reference path, the starting waypoint for trajectory integration is set to the new TOD waypoint. The integration step size is changed to be a fine step size. Alternatively, if the fine integration step size was used to re-compute the reference path, then a feasible path is found and may be relayed 610 to relevant avionics systems.

However, if the descent path is infeasible, the on-aircraft computer device determines 612 the first infeasible segment on the descent path. If the first infeasible segment is a deceleration segment, then the starting waypoint is set to the beginning of that segment and the process continues. Otherwise, the infeasible path candidate cannot be repaired.

The on-aircraft computer device then propagates the descent path forward from the starting waypoint for trajectory integration and collects 614 any penalty costs accumulated from violating any constraints. The propagation may stop at the final waypoint on the descent path, possibly propagating through multiple legs. If the leg is a constant speed leg with idle thrust, the leg is propagated at constant speed using an idle throttle setting. If the leg is a deceleration leg with idle thrust, the leg is propagated down the deceleration leg with idle thrust.

If the leg is a geographical leg (i.e., a leg with a constant flight path angle), the required thrust and spoiler/speed brake is determined at each integration step to fly the specified flight path angle and speed. If the path candidate is infeasible or the fine integration step was used, the feasibility status of the path candidate is saved and the current function terminates. However, if the path candidate is feasible and the coarse integration step was used, the integration step size is changed with the starting waypoint for trajectory set to the TOD and the speed profile of the path candidate is re-calculated 606. The cruise portion of the path candidate may re-use the result determined with the coarse integration since the difference between fine integration and coarse integration for the cruise segment may be relatively small.

The on-aircraft computer device may determine an appropriate deceleration (i.e., δV/δh) that produces feasible flight path angles along an entire specified deceleration segment by looping from the maximum to the minimum allowable deceleration until a feasible deceleration is found. First, the speed difference (ΔV) between the beginning and ending waypoints of the deceleration segment is computed:

$$\Delta V = V_b - V_e$$

where $V_b$ is the CAS at the beginning waypoint of the deceleration segment and $V_e$ is the CAS at the ending waypoint of the deceleration segment. The on-aircraft computer device may then determine a maximum allowable deceleration and a minimum allowable deceleration. The on-aircraft computer device may then determine an estimated altitude at the beginning waypoint of the deceleration segment for a specific speed change per altitude change δV for a particular iteration:

$$N_i = \left(\frac{\Delta V}{\delta V_i}\right),\ i = n_s, \ldots, 1$$

$$\Delta h_i = N_i * \delta h$$

$$H_i^b = H^e + \Delta h_i$$

where $\delta V_i$ is the speed change per altitude change in the ith iteration (e.g., $\delta V_i$=5 knots for the deceleration step of 5 knots change per 100 ft integration step size); δh is the specified altitude change (e.g., 100 ft or 400 ft) per integration step size; $n_S$ is the number of available $\delta V_i$ choices (e.g., $n_s$=5 if $\delta V_i$ can be selected from 5 knots to 1 knot change per altitude step with decrement by 1 knot); $\Delta h_i$ is the altitude difference between the beginning waypoint and ending waypoint of the deceleration leg in the ith iteration; $H^e$ is the altitude of the ending waypoint of the deceleration leg and $H_i^b$ is the estimated altitude of the beginning waypoint of the deceleration segment in the ith iteration.

With $H_i^b$ and $\delta V_i$ determined, the on-aircraft computer device may propagate down the deceleration segment from the estimated beginning waypoint with the specified $\delta V_i/\delta h$ and check the feasibility of the flight path angle. If the flight path angle is infeasible during the propagation, the process is repeated with a smaller deceleration until the minimum allowable deceleration is reached or a deceleration that results in feasible flight path angles along the entire specified deceleration segment is identified.

The idle descent path computed according to the present invention is served as a reference path to generate the initial population $P_0$ of ten flight path candidates by using genetic operators. An equal probability is used to select each genetic operator. The reference path may be one of the ten flight path candidates in the initial population $P_0$. The reference path (i.e., the idle descent path) may be kept in the population for each new generation.

Figure 7:
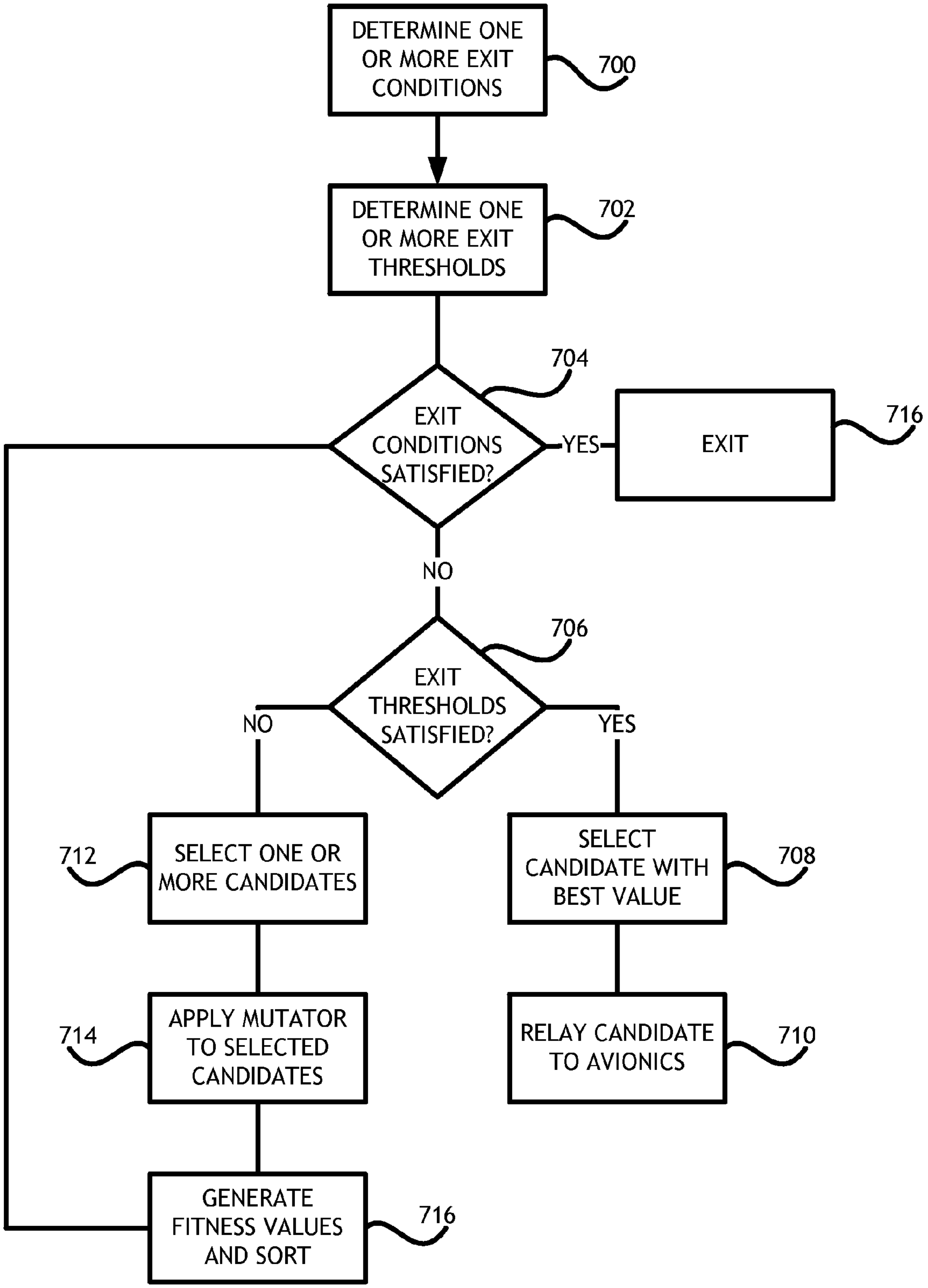
FIG. 7 shows a flowchart for creating flight path candidates.

Referring to FIG. 7, a flowchart for creating flight path candidates is shown. During processing, one or more exit thresholds are determined 702 based on path cost criteria, and one or more exit conditions are established 700. Exit conditions may include the number of generations equaling ten or more, at least one feasible flight path candidate for three consecutive generations, three feasible flight path candidates in the current generation where the difference between the three feasible flight path candidates is smaller than the one or more exit thresholds. A fitness value for each flight path candidate in $P_0$ is determined and the flight path candidates may be sorted based on their fitness values. In at least one embodiment, fitness values are based on factors such as projected fuel consumption and conformity to one or more constraints. If the one or more exit thresholds are satisfied, the flight path candidate with the best fitness value is selected 708 to produce the final descent path and such descent path may be relayed 710 to one or more aircraft avionics systems. If the one or more exit thresholds are not satisfied, a new generation is produced. In at least one embodiment, the five best flight path candidates are selected 712 based on the corresponding fitness values. The five best flight path candidates are used to generate five offspring flight path candidates by applying 714 a genetic operator. Genetic operators may be selected using an equal probability distribution. Two additional flight path candidates may be selected from the remaining flight path candidates to generate two additional offspring flight path candidates.

Fitness values are generated 716 for each of the offspring flight path candidates, the offspring flight path candidates are added to $P_0$, and $P_0$ is sorted based on the fitness values of each flight path candidate. The ten best flight path candidates are moved to the next population $P_1$. In at least one embodiment, the reference path is always moved to $P_1$, even if the reference path must take the place of the last flight path candidate. Iterations may continue according to such methodology until one or more exit criteria is reached.

If no feasible flight paths can be found and the process terminates based on the exit criteria of a threshold number of generations, a pilot may be alerted by a warning message and the flight path candidate with the highest fitness value may be presented to pilots.

In one exemplary embodiment, aircraft performance data for a twin-engine regional jet and common flight parameters are considered. For simplicity, a standard atmospheric model with no temperature deviations and no wind are used. Constraints include a cruise altitude is 40,000 ft; airport speed restriction altitude and speed limits of 10,000 ft and 250 KCAS; final altitude and speed constraint at the end of descent of 3000 ft and 250 KCAS; some RTA constraint imposed on the final waypoint and ground track distance from the initial aircraft cruise position to the final waypoint at 3000 ft is 200 nmi. Maximum and minimum flight path angles during descent are −2 deg. and −6 deg. respectively.

An idle descent path is constructed with the cruise Mach of 0.77 and the descent speed of 290 KCAS. Maximum speeds for OPD planning are 0.81 for the cruise Mach and 320 knots for the descent speed. Maximum speed reduction in the deceleration segment is 5 knots per 100 ft altitude change. The initial aircraft weight is 105,000 lbs and wing reference area is 1208.88 $ft^2$.

To comply with the maximum and minimum flight path angle constraints, the present invention automatically selects 2 knots speed reduction per 100 ft altitude change during the deceleration segment. Under such circumstances, all flight path angles during descent are feasible (i.e., within −2 deg. and −6 deg.), but the RTA constraint is 75 seconds earlier than the idle descent path can achieve. Therefore, the present invention moves the TOD closer to the final waypoint by 5 nmi relative to the TOD determined by the idle descent path and adjusts the cruise Mach from 0.77 to 0.81 and the descent speed from 290 knots to 305 knots to compensate. Also, a speed brake may be deployed from the altitude for the airport speed restriction to the final waypoint.

An RTA-compliant OPD path generated according to the present invention consumes less fuel than a stair-step descent flight path. In the present example, the stair-step descent flight path may consume 251 lbs (37 gallons) more fuel than the RTA-compliant OPD flight path.

Upon receiving an RTA constraint from air traffic controllers, pilots must be able to determine whether the received RTA is feasible (i.e., achievable), given the current aircraft states, aircraft performance limits, temperature deviations and wind conditions. Therefore, a on-aircraft computer device needs to compute a feasible RTA window to enable pilots to accept or reject the RTA. This feasible RTA window indicates the earliest and latest arrival times at a metering waypoint that can be achieved by the aircraft, while complying with other path constraints. If the RTA is within the feasible RTA window, pilots can then accept the RTA. If the RTA is outside the feasible RTA window, pilots should inform air traffic controllers that the proposed RTA is not feasible and should negotiate a new and feasible RTA.

The feasible RTA window may be determined by searching the maximum and minimum air speeds that can be achieved by the aircraft, given the current aircraft states, aircraft performance limits, temperature deviations and wind conditions. The aircraft performance data used for the feasible RTA window determination should include the flight envelope of the aircraft over the altitude range. At least one embodiment of the present invention estimates the earliest arrival time and then estimates the latest arrival time at the metering waypoint. Examples presented herein assume the speed profiles for the flight path segments that are being re-planned must be monotonically decreasing during descent and the re-planned speed profiles must comply with all speed constraints imposed on the descent path (e.g., when the aircraft is below the altitude for airport speed restriction, the re-planned speed cannot exceed the airport speed restriction).

The present invention may consider two cases when running a forward sweep to determine a feasible RTA window: aircraft position is before the TOD (i.e., during cruise) when the determination of the RTA window is triggered; or aircraft position is after the TOD (i.e., during descent) when the determination of the RTA window is triggered. There are several factors that can trigger a determination of a new feasible RTA window, such as new updates of wind and temperature profile data or a new RTA is received from air traffic controllers.

Where the aircraft position is before the TOD embodiments of the present invention perform the backward and forward sweep integration with the new estimated speeds to attempt to generate a new feasible flight path (and possibly a new TOD). Where the aircraft position is after the TOD embodiments of the present invention perform only forward sweep integration since the aircraft has already passed the TOD.

The present invention may start the iteration of the feasible speed search from the maximum and minimum airspeeds of the flight envelope. A forward sweep according to the present invention determines the feasibility of each new estimated speed. When the estimated speed is feasible, the ETA of the new flight path may be stored to capture the RTA window. For infeasible cases, the estimated speed may be modified. The present invention may adjust the estimated speeds by +2 knots for the latest window and −2 knots for the earliest window until the speed is feasible or the process has exited an acceptable speed range. The acceptable speed range is created based on the flight envelope of the aircraft and path constraints. The first feasible flight path for each run indicates the earliest or latest ETA at the metering waypoint since the iteration of the feasible speed search starts from the maximum or minimum airspeed of the flight envelope.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An aircraft computer apparatus comprising:

a processor;

memory connected to the processor;

an antenna connected to the processor; and computer executable program code configured to execute on the processor, wherein the computer executable program code is configured to:

receive a required time of arrival at a metering waypoint from an air traffic controller through the antenna;

determine one or more flight constraints based on at least one of properties associated with a flight path, conditions associated with a flight path and properties associated with an aircraft;

produce a plurality of flight paths comprising a first generation of flight paths, each flight path in the first generation including a substantially continuous descent segment;

assign a fitness value to each flight path in the first generation; and determine a best flight path, the best flight path conforming to the required time of arrival at the metering waypoint and the one or more flight constraints.

2. The computer apparatus of claim 1, wherein the computer executable program code is further configured to:

select a subset of the first generation;

apply at least one mutator to each flight path in the subset of the first generation to produce a second generation; and assign a fitness value to each flight path in the second generation.

3. The computer apparatus of claim 2, wherein at least one mutator is configured to modify a position of a top of descent point along a flight path.

4. The computer apparatus of claim 2, wherein at least one mutator is configured to modify a descent speed associated with a substantially continuous descent segment.

5. The computer apparatus of claim 1, wherein the computer executable program code is further configured to receive weather related data; and wherein the step of producing the plurality of flight paths comprises incorporating the weather related data.

6. The computer apparatus of claim 1, further comprising a data storage element, connected to the processor, containing aircraft specific constraints, wherein the computer executable program code is further configured to ensure each flight path conforms to the aircraft specific constraints.

7. The computer apparatus of claim 1, wherein the computer executable program code is further configured to relay the best flight path that complies with the one or more flight constraints and required time of arrival at the metering waypoint to an aircraft avionics system.

8. A method for producing a substantially continuous descent profile comprising:

receiving a required time of arrival at a metering waypoint from an-on aircraft computer device;

determining from the on aircraft computer device one or more flight constraints based on at least one of properties associated with a flight path, conditions associated with a flight path and properties associated with an aircraft;

producing from the on aircraft computer device a plurality of flight paths comprising a first generation of flight paths, each flight path in the first generation including a substantially continuous descent segment;

assigning a fitness value to each flight path in the first generation from the on aircraft computer device; and determining from the on aircraft computer device, a best flight path, the best flight path conforming to the required time of arrival at the metering waypoint and the one or more flight constraints.

9. The method of claim 8, further comprising:

selecting a subset of the first generation;

applying at least one mutator to each flight path in the subset of the first generation to produce a second generation; and assigning a fitness value to each flight path in the second generation.

10. The method of claim 9, wherein the at least one mutator is configured to modify a position of a top of descent point along a flight path.

11. The method of claim 9, wherein the at least one mutator is configured to modify a descent speed associated with a substantially continuous descent segment.

12. The method of claim 8, further comprising receiving weather related data, wherein producing the plurality of flight paths comprises incorporating the weather related data.

13. The method of claim 8, further comprising ensuring each flight path conforms to one or more aircraft specific constraints.

14. The method of claim 8, further comprising relaying the best flight path that complies with the one or more flight constraints and the required time of arrival at the metering waypoint to an aircraft avionics system.

* * * * *